(12) United States Patent
Shao (10) Patent No.: US 10,748,591 B2
(45) Date of Patent: Aug. 18, 2020

(54) RANDOM CODE GENERATOR

(71) Applicant: eMemory Technology Inc., Hsin-Chu (TW)

(72) Inventor: Chi-Yi Shao, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 16/542,671

(22) Filed: Aug. 16, 2019

(65) Prior Publication Data
US 2020/0227103 A1 Jul. 16, 2020

Related U.S. Application Data

(60) Provisional application No. 62/791,870, filed on Jan. 13, 2019.

(51) Int. Cl.
| | |
|---|---|
| *G11C 8/20* | (2006.01) |
| *G11C 8/18* | (2006.01) |
| *G11C 16/08* | (2006.01) |
| *G11C 16/24* | (2006.01) |
| *G11C 11/4074* | (2006.01) |
| *G06F 12/14* | (2006.01) |

(52) U.S. Cl.
CPC ............ *G11C 8/20* (2013.01); *G06F 12/1408* (2013.01); *G11C 8/18* (2013.01); *G11C 11/4074* (2013.01); *G11C 16/08* (2013.01); *G11C 16/24* (2013.01); *G06F 2212/202* (2013.01)

(58) Field of Classification Search
CPC ....... G11C 8/20; G11C 16/24; G11C 11/4074; G11C 16/08; G11C 8/18; G06F 12/1408; G06F 2212/202
See application file for complete search history.

(56) References Cited

U.S. PATENT DOCUMENTS

| 9,075,675 | B2 | 7/2015 | Liu et al. |
| 2007/0050584 | A1 | 3/2007 | Asauchi |
| 2007/0115727 | A1* | 5/2007 | Jeong ............ G11O 5/145 365/185.23 |

(Continued)

FOREIGN PATENT DOCUMENTS

CN 108958650 A 12/2018

OTHER PUBLICATIONS

Search report issued by EPO dated Apr. 17, 2020.

*Primary Examiner* — Gene N Auduong
(74) *Attorney, Agent, or Firm* — WPAT, PC (57) ABSTRACT

A random code generator includes a control circuit, a high voltage power supply, a memory module and a counter. The control circuit generates a control signal and an enabling signal. During a program cycle, the enabling signal is activated. The high voltage power supply receives the enabling signal. A charge pump of the high voltage power supply generates a program voltage according to an oscillation signal. When the enabling signal is activated, the high voltage power supply outputs the program voltage. The memory module determines a selected memory cell of the memory module according to the control signal. During the program cycle, the selected memory cell receives the program voltage. During the program cycle, the counter counts a pulse number of the oscillation signal to acquire a counting value, and the control circuit determines a random code according to the counting value.

15 Claims, 6 Drawing Sheets

(56) References Cited

U.S. PATENT DOCUMENTS

| | | |
|---|---|---|
| 2007/0217274 A1 | 9/2007 | Nobukata |
| 2012/0119786 A1* | 5/2012 | Shimizu ............... H03K 21/023 |
| | | 327/48 |
| 2017/0200508 A1 | 7/2017 | Grigoriev et al. |
| 2017/0279606 A1 | 9/2017 | Kara-Ivanov et al. |
| 2018/0166130 A1* | 6/2018 | Intrater ................ G11C 13/004 |

\* cited by examiner

RANDOM CODE GENERATOR

This application claims the benefit of U.S. provisional application Ser. No. 62/791,870, filed Jan. 13, 2019, the subject matter of which is incorporated herein by reference.

FIELD OF THE INVENTION

The present invention relates to a random code generator, and more particularly to a random code generator with a non-volatile memory.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is capable of providing a random code. This random code is used as a unique identity code (ID code) of the semiconductor chip to achieve the protecting function.

Generally, the PUF technology acquires the unique random code of the semiconductor chip according to the manufacturing variation of the semiconductor chip. This manufacturing variation includes the semiconductor process variation. That is, even if the PUF semiconductor chip is produced by a precise manufacturing process, the random code cannot be duplicated. Consequently, the PUF semiconductor chip is suitably used in the applications with high security requirements.

Moreover, U.S. Pat. No. 9,613,714 disclosed a one time programming memory cell and a memory array for a PUF technology and an associated random code generating method. In this literature, a one time programmable memory cell and a memory array are manufactured according to the semiconductor process variation. After the program cycle, the unique random code is generated.

SUMMARY OF THE INVENTION

An embodiment of the present invention provides a random code generator. The random code generator includes a control circuit, a high voltage power supply, a memory module and a counter. The control circuit generates a control signal and an enabling signal. During a program cycle, the enabling signal is activated. The high voltage power supply receives the enabling signal. The high voltage power supply generates a program voltage according to an oscillation signal. When the enabling signal is activated, the high voltage power supply outputs the program voltage. When the enabling signal is inactivated, the high voltage power supply stops outputting the program voltage. The memory module receives the control signal, and determines a selected memory cell of the memory module according to the control signal. During the program cycle, the selected memory cell receives the program voltage. The counter receives the oscillation signal and the enabling signal. During the program cycle, the counter counts a pulse number of the oscillation signal to acquire a counting value, and the control circuit determines a random code according to the counting value.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
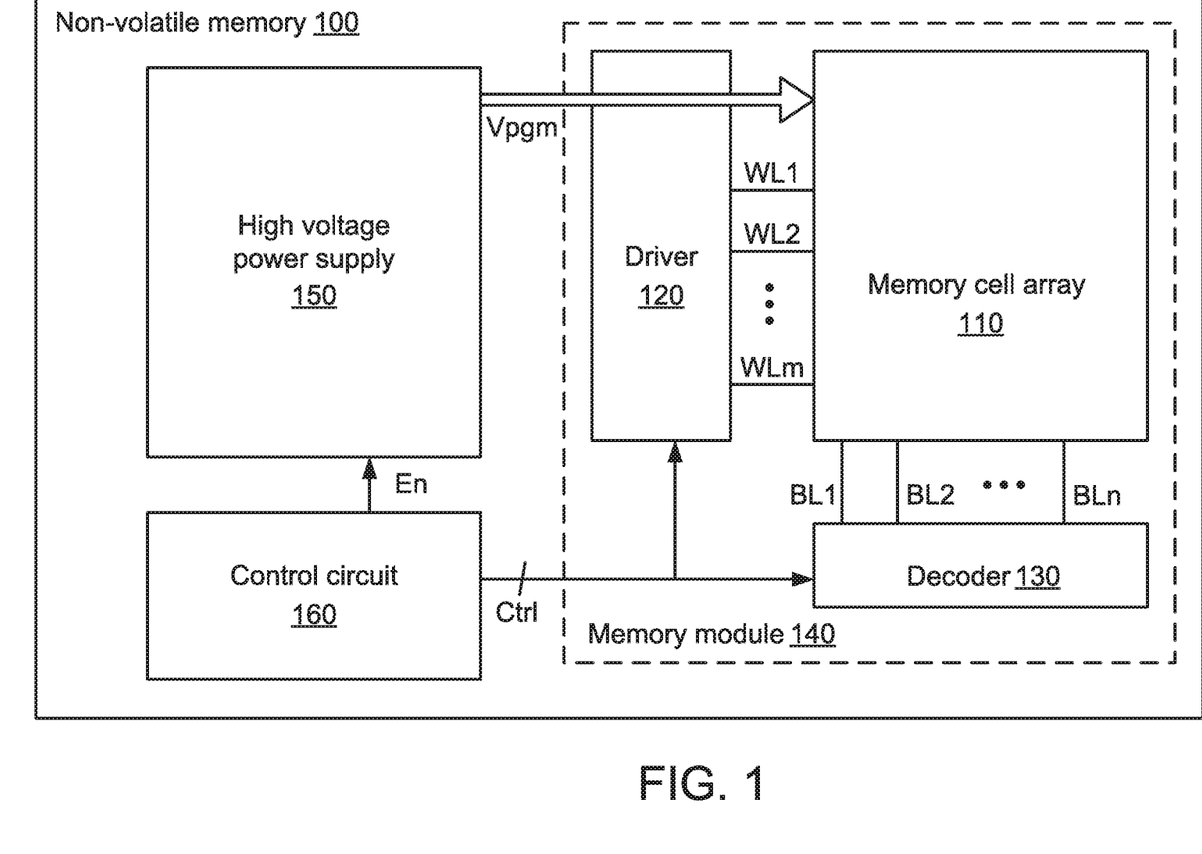
FIG. 1 is a schematic circuit block diagram illustrating a non-volatile memory according to the present invention.

FIG. 1 is a schematic circuit block diagram illustrating a non-volatile memory according to the present invention. The non-volatile memory 100 comprises a memory module 140, a high voltage power supply 150 and a control circuit 160. The memory module 140 comprises a memory cell array 110, a driver 120 and a decoder 130.

The driver 120 and the memory cell array 110 are connected with each other through plural word lines WL1~WLm. The decoder 130 and the memory cell array 110 are connected with each other through plural bit lines BL1~BLn. Since the memory cells have different structures, the driver 120 and the memory cell array 110 may be connected with each other through plural signal lines (e.g., select lines).

The control circuit 160 is connected with the high voltage power supply 150, the driver 120 and the decoder 130. The control circuit 160 provides a control signal Ctrl to the driver 120 and the decoder 130 of the memory module 140. According to the control signal Ctrl, the driver 120 activates one of the word lines WL1~WLm. Moreover, according to the control signal Ctrl, the decoder 130 activates one of the bit lines BL1~BLn. In other words, the control circuit 160 determines a selected memory cell of the memory cell array 110 according to the control signal Ctrl and performs a program operation or a read operation on the selected memory cell.

The control circuit 160 provides an enabling signal En to the high voltage power supply 150. While the control circuit 160 performs the program operation on the selected memory cell, the high voltage power supply 150 provides a program voltage Vpgm according to the enabling signal En. The program voltage Vpgm is transmitted to the selected memory cell through the driver 120 so as to perform the program operation on the selected memory cell.

A process of performing the program operation on the non-volatile memory 100 will be described as follows. For clarification, the memory cells of the memory cell array 110 are one time programmable memory cells (also referred as OTP memory cells).

Figure 2A:
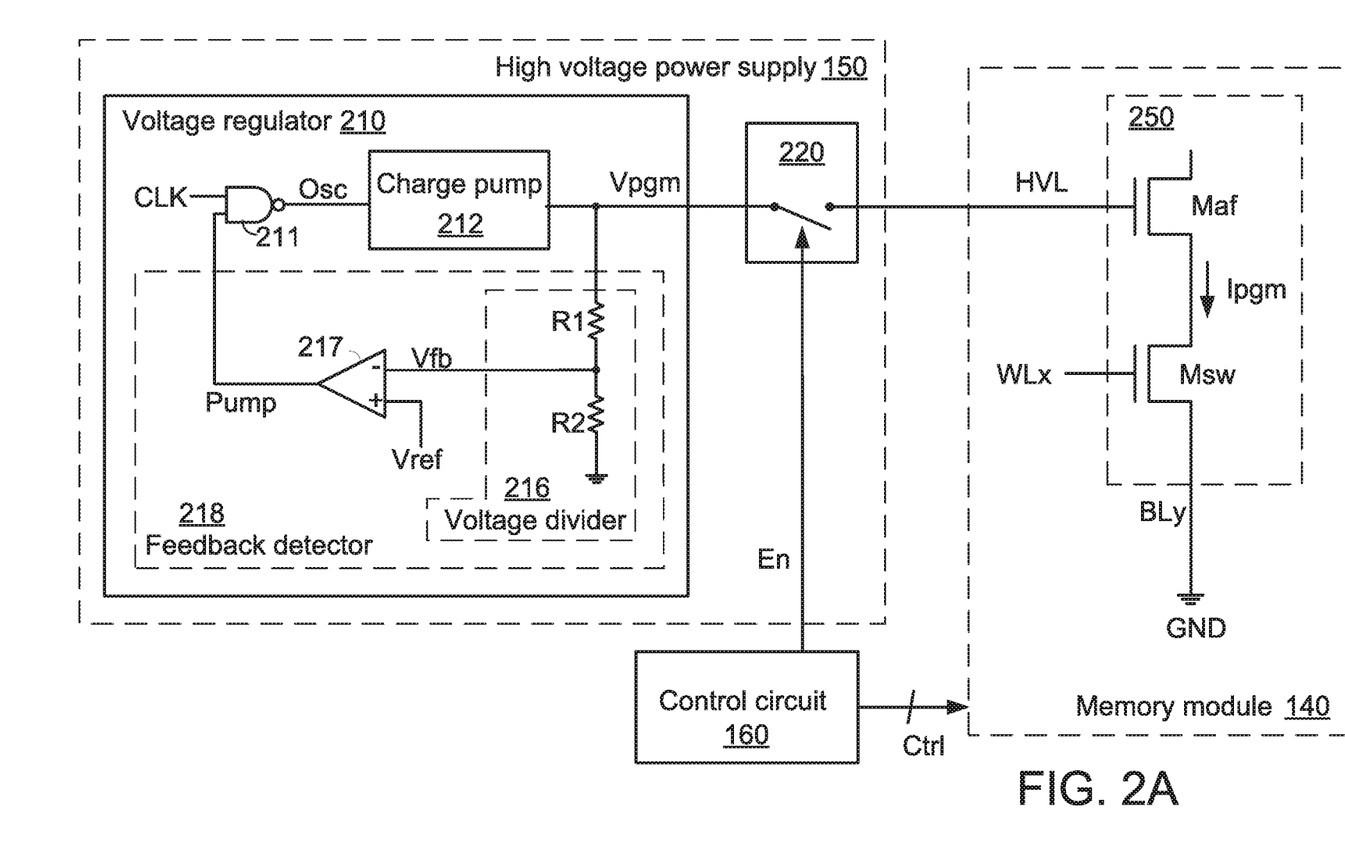
FIG. 2A is a schematic circuit diagram illustrating the operations of the non-volatile memory while the program operation is performed.

FIG. 2A is a schematic circuit diagram illustrating the operations of the non-volatile memory while the program operation is performed. When the program operation is started, the control circuit 160 provides the control signal Ctrl and activates the enabling signal En. In addition, the driver (not shown) activates the word lines WLx according to the control signal Ctrl, and the decoder (not shown) connects the bit line BLy to a ground terminal GND according to the control signal Ctrl. Consequently, the memory cell 250 of the memory cell array 110 is the selected memory cell. In other words, the selected memory cell of the memory module 140 is determined according to the control signal Ctrl.

The memory cell 250 is an OTP memory cell. The memory cell 250 comprises an antifuse transistor Maf and a switch transistor Msw. The first source/drain terminal of the antifuse transistor Maf is floating. The gate terminal of the antifuse transistor Maf is connected with a high voltage line HVL. The second source/drain terminal of the antifuse transistor Maf is connected with the first source/drain terminal of the switch transistor Msw. The gate terminal of the switch transistor Msw is connected with the word line WLx. The second source/drain terminal of the switch transistor Msw is connected with the bit line BLy. In case that the gate oxide layer of the antifuse transistor Maf is not ruptured, the antifuse transistor Maf is in a high resistance state. In case that the gate oxide layer of the antifuse transistor Maf is ruptured, the antifuse transistor Maf is in a low resistance state. Consequently, the high resistance state and the low resistance state of the antifuse transistor Maf may be considered as two storage states of the OTP memory cell.

The high voltage power supply 150 comprises a power switch 220 and a voltage regulator 210. The output terminal of the voltage regulator 210 generates the program voltage Vpgm. A first terminal of the power switch 220 is connected with the output terminal of the voltage regulator 210. A second terminal of the power switch 220 is connected with the high voltage line HVL. A control terminal of the power switch 220 receives the enabling signal En.

The voltage regulator 210 comprises a clock signal selector 211, a charge pump 212 and a feedback detector 218.

The charge pump 212 receives an oscillation signal Osc and generates the program voltage Vpgm. If the voltage level of the oscillation signal Osc is kept unchanged, the program voltage Vpgm is gradually decreased. Whereas, if the oscillation signal Osc is continuously switched between the high level state and the low level state, the program voltage Vpgm is gradually increased.

The feedback detector 218 comprises a voltage divider 216 and a comparator 217. The voltage divider 216 comprises two serially-connected resistors R1 and R2. The voltage divider 216 receives the program voltage Vpgm. The node between the resistor R1 and the resistor R2 generates a feedback signal Vfb. The negative input terminal of the comparator 217 receives the feedback signal Vfb. The positive input terminal of the comparator 217 receives a reference voltage Vref. The output terminal of the comparator 217 generates a pump control signal Pump.

The clock signal selector 211 comprises a NAND gate. The first input terminal of the NAND gate receives a clock signal CLK. The second input terminal of the NAND gate receives the pump control signal Pump. The output terminal of the NAND gate generates the oscillation signal Osc. In other words, the clock signal selector 211 generates the oscillation signal Osc according to the pump control signal Pump. For example, if the feedback signal Vfb is higher than the reference voltage Vref, the pump control signal Pump is in the low level state. Consequently, the clock signal selector 211 is disabled, and the oscillation signal Osc is maintained in the high level state (i.e., with the constant voltage level). Under this circumstance, the program voltage Vpgm is gradually decreased. Whereas, if the feedback signal Vfb is lower than the reference voltage Vref, the pump control signal Pump is in the high level state. Consequently, the clock signal CLK is converted into the oscillation signal Osc by the clock signal selector 211. Under this circumstance, the oscillation signal Osc contains plural pulses, and the program voltage Vpgm is gradually increased.

Generally, as magnitude of the program voltage Vpgm is increased, the magnitude of the feedback signal Vfb is increased. On the other hand, as the magnitude of the program voltage Vpgm is decreased, the magnitude of the feedback signal Vfb is decreased. In case that the output current of the voltage regulator 210 is higher, the voltage regulator 210 is in a heavy load condition. Under this circumstance, the clock signal selector 211 generates the oscillation signal Osc with more pulses to the charge pump 212 according to the pump control signal Pump from the feedback detector 218. Whereas, in case that the output current of the voltage regulator 210 is lower, the voltage regulator 210 is in a light load condition. Under this circumstance, the clock signal selector 211 generates the oscillation signal Osc with less pulses to the charge pump 212 according to the pump control signal Pump from the feedback detector 218. Consequently, when the voltage regulator 210 reaches a steady state, the program voltage Vpgm is maintained at a level close to a target voltage. The target voltage is equal to Vref×(1+R1/R2).

When the program operation is started, the control circuit 160 activates the enabling signal En. Consequently, the power switch 220 is in a close state, and the program voltage Vpgm is transmitted to the gate terminal of the antifuse transistor Maf. In the selected memory cell 250, the word line WLx is activated and the switch transistor Msw is turned on. Since the voltage stress withstood by the region between the gate terminal of the antifuse transistor Maf and the second source/drain terminal of the antifuse transistor Maf is equal to the program voltage Vpgm, the gate oxide layer of the antifuse transistor Maf is ruptured.

After a predetermined program cycle (e.g., 10 µs), the control circuit 160 inactivates the enabling signal En. Consequently, the power switch 220 is in an open state, and the program operation is ended.

Figure 2B:
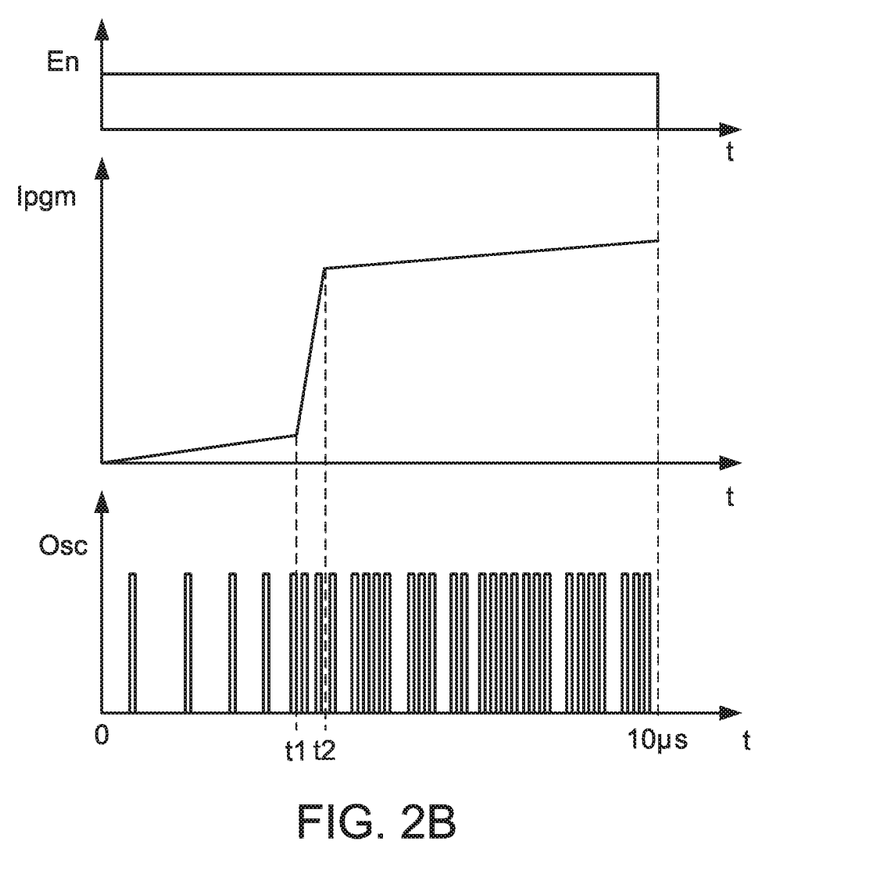
FIG. 2B is a schematic timing waveform diagram illustrating associated signals of the non-volatile memory corresponding to the state change of the selected memory cell and the operation of the charge pump while the program operation is performed.

FIG. 2B is a schematic timing waveform diagram illustrating associated signals of the non-volatile memory corresponding to the state change of the selected memory cell and the operation of the charge pump while the program operation is performed. For example, the predetermined program cycle is 10 µs. Consequently, in case that the enabling signal En from the control circuit 160 is maintained in the high level state for 10 µs, the enabling signal En is activated. Then, the enabling signal En from the control circuit 160 is in the low level state, and thus the enabling signal En is inactivated. The time period of activating the enabling signal En is defined as the program cycle.

In the initial stage of the program operation (e.g., before the time point t1), the gate oxide layer of the antifuse transistor Maf in the selected memory cell 250 is not ruptured. That is, the antifuse transistor Maf is in the high resistance state. Consequently, the program current Ipgm is very low. Under this circumstance, the frequency of the oscillation signal Osc is lower, and the program voltage Vpgm from the charge pump 212 is maintained at the level close to the target voltage (e.g., 12V).

In the middle stage of the program operation (e.g., between the time point t1 and the time point t2), the gate oxide layer of the antifuse transistor Maf in the selected memory cell 250 is gradually ruptured. That is, the antifuse transistor Maf is switched from the high resistance state to the low resistance state. Consequently, the program current Ipgm is gradually increased. To keep the program voltage Vpgm from the charge pump 212 at the target voltage, the feedback detector 218 issues the pump control signal Pump to control the clock signal selector 211. Consequently, the oscillation signal Osc toggles at a higher frequency.

In the time interval between the time point t2 and t=10 μs, the gate oxide layer of the antifuse transistor Maf in the selected memory cell 250 is ruptured. That is, the antifuse transistor Maf is in the low resistance state. Consequently, the program current Ipgm is very high. To keep the program voltage Vpgm from the charge pump 212 at the target voltage, the feedback detector 218 issues the pump control signal Pump to control the clock signal selector 211. Consequently, the frequency of the oscillation signal Osc is maintained at the higher frequency.

Generally, the semiconductor process variation is inevitable. No matter how precisely the OTP memory cells are fabricated, a minute difference between two adjacent OTP memory cells occurs randomly.

Consequently, during the program operation, it is unable to accurately estimate the time point t1 that the gate oxide layer of the antifuse transistor Maf starts to be ruptured and the time point t2 that the gate oxide layer of the antifuse transistor Maf is completely ruptured. That is to say, the pulse number of the oscillation signal Osc is unpredictable since the oscillation signal Osc toggles at different frequency when the antifuse transistor Maf in the OTP memory cell is completely ruptured and when the one is not ruptured.

Figure 3:
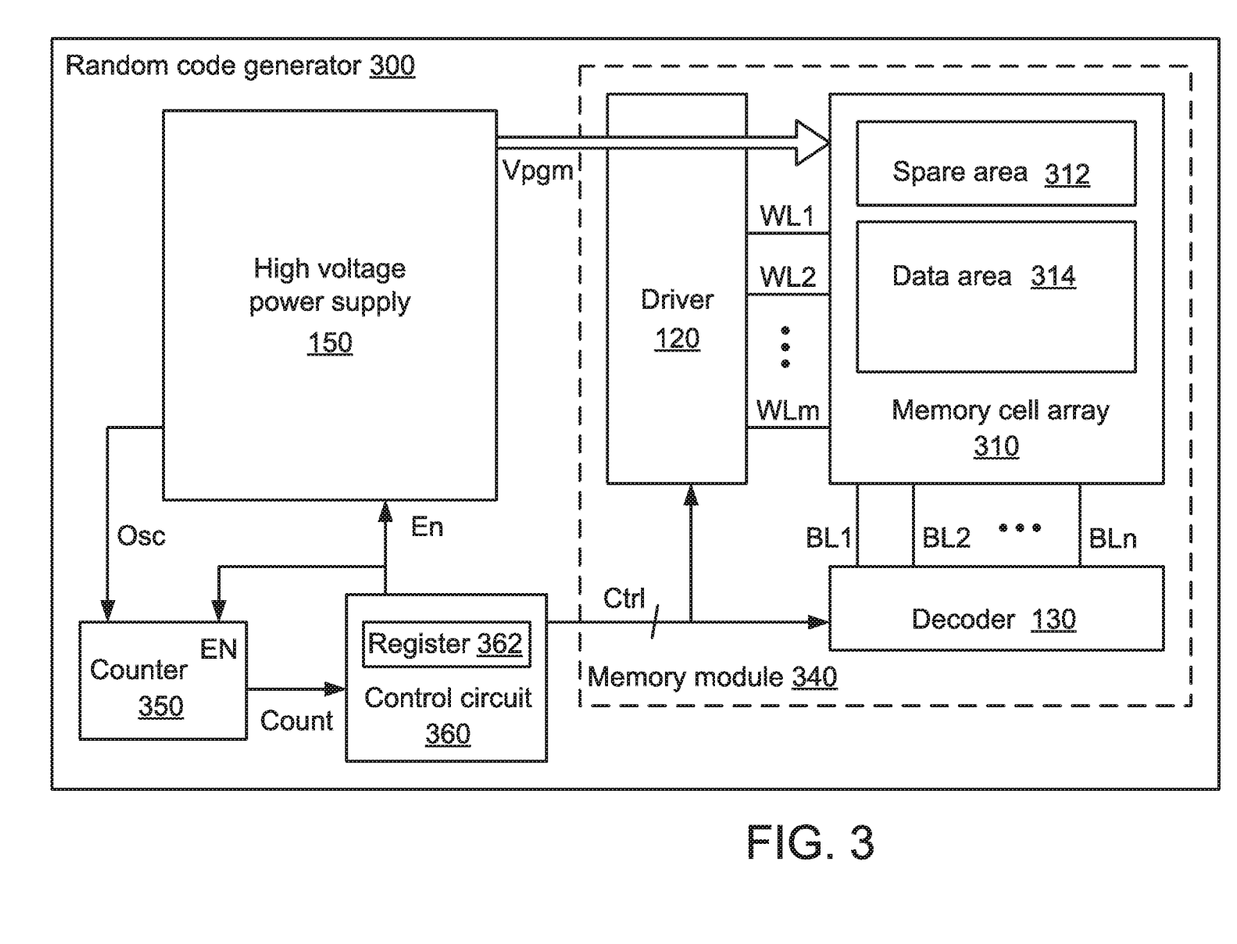
FIG. 3 is a schematic circuit block diagram illustrating a random code generator according to an embodiment of the present invention.

Due to the characteristics of the non-volatile memory, the structure of the non-volatile memory may be modified to be a random code generator. FIG. 3 is a schematic circuit block diagram illustrating a random code generator according to an embodiment of the present invention. The random code generator comprises a memory module 340, a high voltage power supply 150, a counter 350 and a control circuit 360.

The memory module 340 comprises a memory cell array 310, a driver 120 and a decoder 130. The memory cell array 310 is divided into a spare area 312 and a data area 314. Each of the spare area 312 and the data area 314 contains plural memory cells.

The driver 120 and the memory cell array 310 are connected with each other through plural word lines WL1~WLm. The decoder 130 and the memory cell array 310 are connected with each other through plural bit lines BL1~BLn. Since the memory cells have different structures, the driver 120 and the memory cell array 310 may be connected with each other through plural signal lines (e.g., select lines).

The control circuit 360 is connected with the high voltage power supply 150, the driver 120 and the decoder 130. The control circuit 360 provides a control signal Ctrl to the driver 120 and the decoder 130 of the memory module 340. According to the control signal Ctrl, the driver 120 activates one of the word lines WL1~WLm, and the decoder 130 activates one of the bit lines BL1~BLn. In other words, the control circuit 360 determines a selected memory cell from the spare area 312 or the data area 314 of the memory cell array 310 according to the control signal Ctrl and performs a program operation or a read operation on the selected memory cell.

The control circuit 360 provides an enabling signal En to the high voltage power supply 150 and the counter 350. While the control circuit 360 performs the program operation on the selected memory cell, the high voltage power supply 150 provides a program voltage Vpgm according to the enabling signal En. The program voltage Vpgm is transmitted to the selected memory cell through the driver 120 so as to perform the program operation on the selected memory cell.

The enabling terminal EN of the counter 350 receives the enabling signal En from the control circuit 360. The input terminal of the counter 350 receives the oscillation signal Osc. The output terminal of the counter 350 generates a counting value Count.

While the control circuit 360 performs the program operation on the selected memory cell 330 (see FIG. 4A), the control circuit 360 issues the enabling signal En to control the power switch 220 and the counter 350. Consequently, the power switch 220 is in the close state, and the counter 350 starts to count the pulse number of the oscillation signal Osc.

During the program cycle, the counter 350 counts the pulse number of the oscillation signal Osc. After the program cycle, the control circuit 360 receives the counting value Count from the counter 350. In addition, the control circuit 360 determines a random code according to the counting value Count.

The operations of the random code generator 300 will be described as follows. For clarification, the memory cells of the memory cell array 310 are one time programmable memory cells (also referred as OTP memory cells). The structures of the high voltage power supply 150 and the selected memory cell 330 are similar to those of FIG. 2A, and are not redundantly described herein.

Figure 4A:
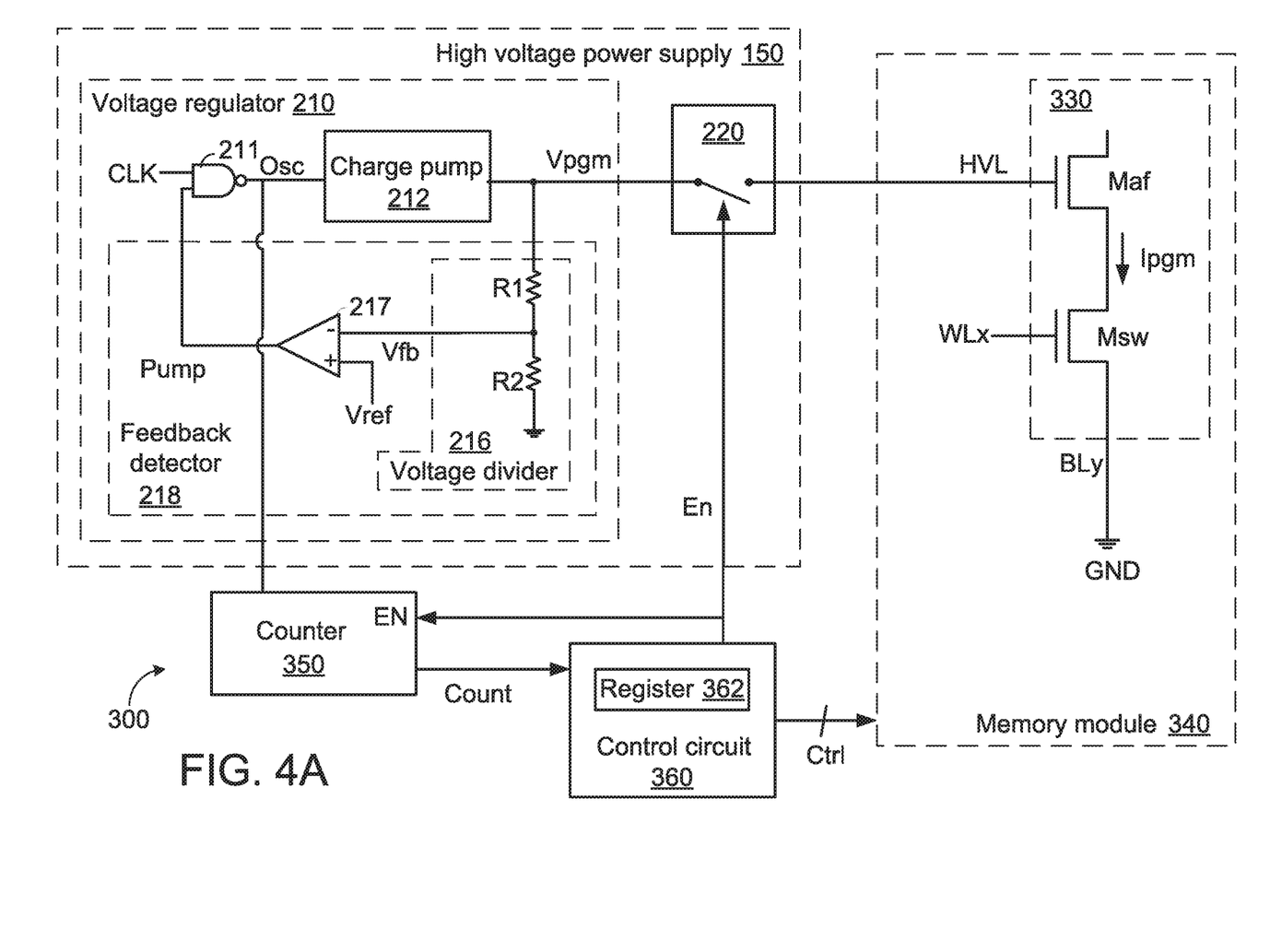
FIG. 4A is a schematic circuit diagram illustrating the operations of the random code generator while the program operation is performed.

FIG. 4A is a schematic circuit diagram illustrating the operations of the random code generator while the program operation is performed. When the program operation is started, the control circuit 360 provides the control signal Ctrl and activates the enabling signal En. In addition, the driver (not shown) activates the word lines WLx according to the control signal Ctrl, and the decoder (not shown) connects the bit line BLy to a ground terminal GND according to the control signal Ctrl. Consequently, the memory cell 330 of the memory cell array 310 is the selected memory cell. In other words, the selected memory cell of the memory module 340 is determined according to the control signal Ctrl.

While the control circuit 360 performs the program operation on the selected memory cell, the high voltage power supply 150 provides a program voltage Vpgm according to the enabling signal En. The program voltage Vpgm is transmitted to the selected memory cell through the driver 120 so as to perform the program operation on the selected memory cell 330.

During the program cycle, the counter 350 counts the pulse number of the oscillation signal Osc according to the activated enabling signal En. After the program cycle, the control circuit 360 receives the counting value Count from the counter 350. In addition, the control circuit 360 determines a random code according to the counting value Count.

Figure 4B:
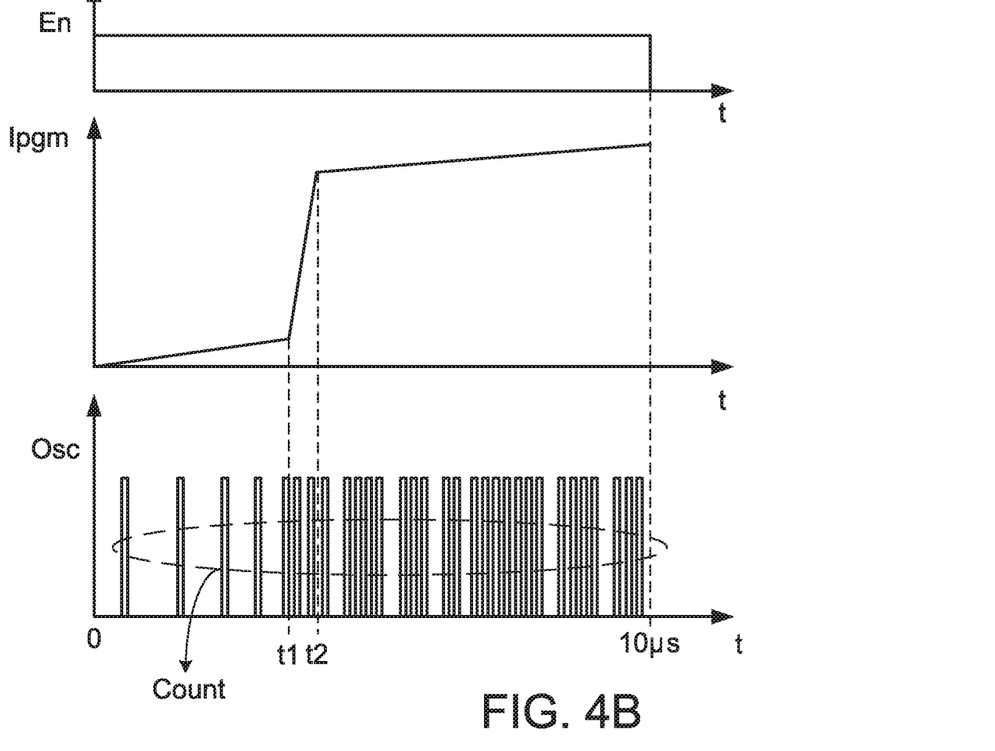
FIG. 4B is a schematic timing waveform diagram illustrating associated signals of the random code generator corresponding to the state change of the selected memory cell, the operation of the charge pump and the operation of the counter while the program operation is performed.

FIG. 4B is a schematic timing waveform diagram illustrating associated signals of the random code generator corresponding to the state change of the selected memory cell, the operation of the charge pump and the operation of the counter while the program operation is performed. For example, the predetermined program cycle is 10 μs. The enabling signal En from the control circuit 360 is kept at the high level state for 10 μs, that is to say, the enabling signal En is activated. Then, the enabling signal En from the control circuit 360 is de-asserted to the low level state, and thus the enabling signal En is inactivated.

In the initial stage of the program operation (e.g., before the time point t1), the gate oxide layer of the antifuse transistor Maf in the selected memory cell 330 is not ruptured. That is, the antifuse transistor Maf is in the high resistance state. Consequently, the program current Ipgm is very low. Under this circumstance, the frequency of the oscillation signal Osc is lower, and the program voltage Vpgm from the charge pump 212 is maintained at the level close to the target voltage (e.g., 12V).

In the middle stage of the program operation (e.g., between the time point t1 and the time point t2), the gate oxide layer of the antifuse transistor Maf in the selected memory cell 330 is gradually ruptured. That is, the antifuse transistor Maf is switched from the high resistance state to the low resistance state. Consequently, the program current Ipgm is gradually increased. To keep the program voltage Vpgm from the charge pump 212 at the target voltage, the feedback detector 218 issues the pump control signal Pump to control the clock signal selector 211. Consequently, the frequency of the oscillation signal Osc increases.

In the time interval between the time point t2 and t=10 μs, the gate oxide layer of the antifuse transistor Maf in the selected memory cell 330 is ruptured. That is, the antifuse transistor Maf is in the low resistance state. Consequently, the program current Ipgm is very high. To keep the program voltage Vpgm from the charge pump 212 at the target voltage, the feedback detector 218 issues the pump control signal Pump to control the clock signal selector 211. Consequently, the frequency of the oscillation signal Osc toggles at the higher frequency.

In accordance with the present invention, the counter 350 of the random code generator 300 is used to count the pulse number of the oscillation signal Osc. After the program cycle, the counter 350 issues the counting value Count to the control circuit 360. According to the counting value Count, the control circuit 360 determines a random code.

In an embodiment, the counter 350 is a one-bit counter. The one-bit counter provides a one-bit counting value Count to the control circuit 360. Consequently, the one-bit counting value is used as the one-bit random code by the control circuit 360.

It is noted that the counter is not restricted to the one-bit counter. For example, in another embodiment, the counting value Count is used as the one-bit random code by the control circuit 360. For example, if the counting value Count of the counter 350 is an odd number, the control circuit 360 determines the logic value "1" as the one-bit random code. Whereas, if the counting value Count of the counter 350 is an even number, the control circuit 360 determines the logic value "0" as the one-bit random code.

Generally, the semiconductor process variation is inevitable. No matter how precisely the OTP memory cells are fabricated, a minute difference between two adjacent OTP memory cells occurs randomly. Consequently, during the program operation, it is unable to accurately realize the time point t1 that the gate oxide layer of the antifuse transistor Maf starts to be ruptured and the time point t2 that the gate oxide layer of the antifuse transistor Maf is completely ruptured. In other words, the counting value from the counter 350 is unpredictable. Consequently, the control circuit 360 determines the one-bit random code according to the counting value of the counter 350.

In another embodiment, the random code generator can generate a multi-bit random code. The operating principles will be described as follows.

As mentioned above, the spare area 312 of the memory cell array 310 comprises plural OTP memory cells. The control circuit 360 selects some of the OTP memory cells from the spare area 312 and performs program operations on the selected OTP memory cells sequentially.

For example, after the control circuit 360 determines a first selected OTP memory cell from the spare area 312 and performs the program operation on the first selected OTP memory cell, the counting value of the counter 350 is used as a first bit of the random code by the control circuit 360 and temporarily stored in a register 362 of the control circuit 360.

Similarly, after the control circuit 360 determines a second selected OTP memory cell from the spare area 312 and performs the program operation on the second selected OTP memory cell, the counting value of the counter 350 is used as a second bit of the random code by the control circuit 360 and temporarily stored in the register 362.

After the control circuit 360 determines eight selected OTP memory cells from the spare area 312 and performs the program operations on the eight selected OTP memory cells, the control circuit 360 acquires one-byte random code. The one-byte random code is temporarily stored in the register 362.

Then, the one-byte random code in the register 362 is written into the data area of the memory cell array 310 by the control circuit 360. When an external circuit (not shown) requests the random code, the random code generator 300 reads the random code from the data area and outputs the random code to the external circuit.

From the above descriptions, the present invention provides a random code generator. Due to the uncertainty of the program operation on the memory cell, the random code generator generates the random code according to the oscillation signal Osc received by the charge pump 212.

It is noted that the memory cell used in the present invention is not restricted to the OTP memory cell. The memory cell to be programmed by a high voltage (i.e., the program voltage) can be used in the random code generator of the present invention.

Figure 5A:
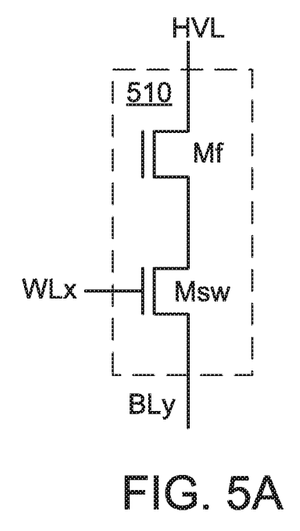
FIGS. 5A, 5B and 5C are schematic circuit diagrams illustrating some other exemplary memory cells used in the random code generator of the present invention.
Figure 5B:
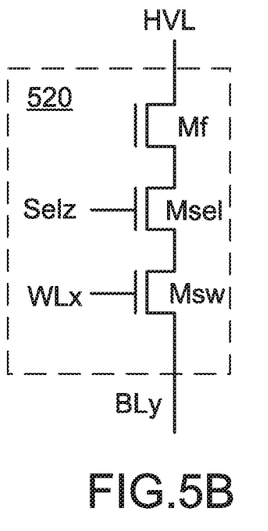
Figure 5C:
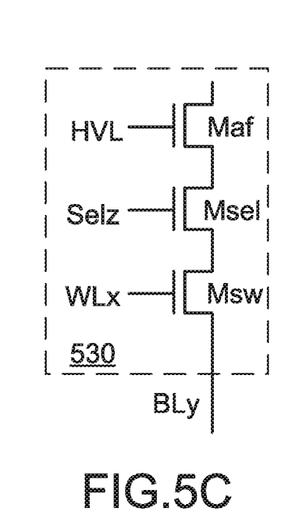

FIGS. 5A, 5B and 5C are schematic circuit diagrams illustrating some other exemplary memory cells used in the random code generator of the present invention.

In the example of FIG. 5A, the memory cell 510 comprises a floating gate transistor Mf and a switch transistor Msw. The first source/drain terminal of the floating gate transistor Mf is connected with the high voltage line HVL. The second source/drain terminal of the floating gate transistor Mf is connected with the first source/drain terminal of the switch transistor Msw. The gate terminal of the switch transistor Msw is connected with the word line WLx. The second source/drain terminal of the switch transistor Msw is connected with the bit line BLy. While the program operation is performed, the high voltage line HVL receives the program voltage, the word line WLx is activated, and the bit line BLy is connected with the ground terminal. After the switch transistor Msw is turned on, hot carriers (e.g., electrons) are injected into the gate terminal of the floating gate transistor Mf. Consequently, the program operation is completed.

In the example of FIG. 5B, the memory cell 520 comprises a floating gate transistor Mf, a select transistor Msel and a switch transistor Msw. The first source/drain terminal of the floating gate transistor Mf is connected with the high voltage line HVL. The second source/drain terminal of the floating gate transistor Mf is connected with the first source/drain terminal of the select transistor Msel. The gate terminal of the select transistor Msel is connected with a select line Selz. The second source/drain terminal of the select transistor Msel is connected with the first source/drain terminal of the switch transistor Msw. The gate terminal of the switch transistor Msw is connected with the word line WLx. The second source/drain terminal of the switch transistor Msw is connected with the bit line BLy. While the program operation is performed, the high voltage line HVL receives the program voltage, the word line WLx and the select line Selz are activated, and the bit line BLy is connected with the ground terminal. After the switch transistor Msw and the select transistor Msel are turned on, hot carriers (e.g., electrons) are injected into the gate terminal of the floating gate transistor Mf.

Consequently, the program operation is completed.

In the example of FIG. 5C, the memory cell 530 comprises an antifuse transistor Maf, a select transistor Msel and a switch transistor Msw. The first source/drain terminal of the antifuse transistor Maf is floating. The gate terminal of the antifuse transistor Maf is connected with a high voltage line HVL. The second source/drain terminal of the antifuse transistor Maf is connected with the first source/drain terminal of the select transistor Msel. The gate terminal of the select transistor Msel is connected with a select line Selz. The second source/drain terminal of the select transistor Msel is connected with the first source/drain terminal of the switch transistor Msw. The gate terminal of the switch transistor Msw is connected with the word line WLx. The second source/drain terminal of the switch transistor Msw is connected with the bit line BLy. While the program operation is performed, the high voltage line HVL receives the program voltage, the word line WLx and the select line Selz are activated, and the bit line BLy is connected with the ground terminal. After the switch transistor Msw and the select transistor Msel are turned on, the voltage stress applied to the antifuse transistor Maf results in the rupture of the gate oxide layer. Consequently, the program operation is completed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A random code generator, comprising:
   a control circuit generating a control signal and an enabling signal, wherein during a program cycle, the enabling signal is activated;
   a high voltage power supply receiving the enabling signal, wherein the high voltage power supply generates a program voltage according to an oscillation signal, wherein when the enabling signal is activated, the high voltage power supply outputs the program voltage, wherein when the enabling signal is inactivated, the high voltage power supply stops outputting the program voltage;
   a memory module receiving the control signal, and determining a selected memory cell of the memory module according to the control signal, wherein during the program cycle, the selected memory cell receives the program voltage; and
   a counter receiving the oscillation signal and the enabling signal, wherein during the program cycle, the counter counts a pulse number of the oscillation signal to acquire a counting value, and the control circuit determines a random code according to the counting value.

2. The random code generating method as claimed in claim 1, wherein the high voltage power supply comprises:
   a voltage regulator comprising a charge pump, a clock signal selector and a feedback detector, wherein the charge pump generates the program voltage according to the oscillation signal, the feedback detector generates a pump control signal according to the program voltage, and the clock signal selector generates the oscillation signal according to a clock signal and the pump control signal; and
   a power switch, wherein a first terminal of the power switch receives the program voltage, a second terminal of the power switch is connected with the selected memory cell, and a control terminal of the power switch receives the enabling signal,
   wherein during the program cycle, the power switch is in a close state, and the high voltage power supply outputs the program voltage to the selected memory cell.

3. The random code generating method as claimed in claim 2, wherein the voltage regulator comprises:
   the charge pump, wherein an input terminal of the charge pump receives the oscillation signal, and an output terminal of the charge pump generates the program voltage;
   the feedback detector comprising a voltage divider and a comparator, wherein the voltage divider is connected with the output terminal of the charge pump and generates a feedback signal, wherein a first input terminal of the comparator receives the feedback signal, a second input terminal of the comparator receives a reference voltage, and an output terminal of the comparator generates the pump control signal; and
   the clock signal selector receiving the clock signal and the pump control signal, and generating the oscillation signal,
   wherein if the feedback signal is higher than the reference voltage, the oscillation signal with a fixed voltage level is generated by the clock signal selector according to the pump control signal, wherein if the feedback signal is lower than the reference voltage, the clock signal is converted into the oscillation signal by the clock signal selector according to the pump control signal.

4. The random code generator as claimed in claim 3, wherein the voltage divider comprises a first resistor and a second resistor, wherein the first resistor and the second resistor are serially connected between the output terminal of the charge pump and a ground terminal, and a node between the first resistor and the second resistor generates the feedback signal.

5. The random code generator as claimed in claim 3, wherein the clock signal selector comprises a NAND gate, wherein a first input terminal of the NAND gate receives the clock signal, a second input terminal of the NAND gate receives the pump control signal, and an output terminal of the NAND gate generates the oscillation signal.

6. The random code generating method as claimed in claim 1, wherein the memory module comprises:
a memory cell array connected with plural word lines and plural bit lines, wherein the memory cell array is divided into a spare area and a data area, and each of the spare area and the data area contains plural memory cells;
a driver connected with the plural word lines, and receiving the control signal, wherein the driver activates a specified word line of the plural word lines according to the control signal; and
a decoder connected with the plural bit lines, and receiving the control signal, wherein the decoder activates a specified bit line of the plural bit lines according to the control signal,
wherein the selected memory cell in the spare area of the memory cell array is determined according to the specified word line and the specified bit line.

7. The random code generator as claimed in claim 6, wherein the selected memory cell comprises an antifuse transistor and a switch transistor, wherein a first source/drain terminal of the antifuse transistor is floating, a gate terminal of the antifuse transistor Maf is connected with a high voltage line to receive the program voltage, a second source/drain terminal of the antifuse transistor is connected with a first source/drain terminal of the switch transistor, a gate terminal of the switch transistor is connected with the specified word line, and a second source/drain terminal of the switch transistor is connected with the specified bit line.

8. The random code generator as claimed in claim 6, wherein the selected memory cell comprises a floating gate transistor and a switch transistor, wherein a first source/drain terminal of the floating gate transistor is connected with a high voltage line to receive the program voltage, a second source/drain terminal of the floating gate transistor is connected with a first source/drain terminal of the switch transistor, a gate terminal of the switch transistor is connected with the specified word line, and a second source/drain terminal of the switch transistor is connected with the specified bit line.

9. The random code generator as claimed in claim 6, wherein the random code is written into the data area of the memory cell array by the control circuit.

10. The random code generator as claimed in claim 9, wherein the control circuit comprises a register for temporarily storing the random code, and the random code is written from the register into the data area of the memory cell array.

11. The random code generating method as claimed in claim 1, wherein the memory module comprises:
a memory cell array connected with plural word lines, plural select lines and plural bit lines, wherein the memory cell array is divided into a spare area and a data area, and each of the spare area and the data area contains plural memory cells;
a driver connected with the plural word lines and the plural select lines, and receiving the control signal, wherein the driver activates a specified word line of the plural word lines and a specified select line of the plural select lines according to the control signal; and
a decoder connected with the plural bit lines, and receiving the control signal, wherein the decoder activates a specified bit line of the plural bit lines according to the control signal,
wherein the selected memory cell in the spare area of the memory cell array is determined according to the specified word line, the specified select line and the specified bit line.

12. The random code generator as claimed in claim 11, wherein the selected memory cell comprises an antifuse transistor, a select transistor and a switch transistor, wherein a first source/drain terminal of the antifuse transistor is floating, a gate terminal of the antifuse transistor is connected with a high voltage line to receive the program voltage, a second source/drain terminal of the antifuse transistor is connected with a first source/drain terminal of the select transistor, a gate terminal of the select transistor is connected with the specified select line, a second source/drain terminal of the select transistor is connected with a first source/drain terminal of the switch transistor, a gate terminal of the switch transistor is connected with the specified word line, and a second source/drain terminal of the switch transistor is connected with the specified bit line.

13. The random code generator as claimed in claim 11, wherein the selected memory cell comprises a floating gate transistor, a select transistor and a switch transistor, wherein a first source/drain terminal of the floating gate transistor is connected with a high voltage line to receive the program voltage, a second source/drain terminal of the floating gate transistor is connected with a first source/drain terminal of the select transistor, a gate terminal of the select transistor is connected with the specified select line, a second source/drain terminal of the select transistor is connected with a first source/drain terminal of the switch transistor, a gate terminal of the switch transistor is connected with the specified word line, and a second source/drain terminal of the switch transistor is connected with the specified bit line.

14. The random code generator as claimed in claim 1, wherein the counter is a one-bit counter, and the counting value of the counter is used as the random code by the control circuit.

15. The random code generator as claimed in claim 1, wherein if the counting value of the counter is an odd number, the control circuit determines a first logic value as the random code, wherein if the counting value of the counter is an even number, the control circuit determines a second logic value as the random code.

* * * * *